United States Patent
Ilkal et al.

(10) Patent No.: US 10,311,248 B1
(45) Date of Patent: Jun. 4, 2019

(54) MANAGING DELEGATED ACCESS PERMISSIONS

(71) Applicants: Nadeem Mohammed Yusuf Ilkal, Santa Clara, CA (US); Andrew Ernest Goldfinch, San Diego, CA (US); Yi Zhang, San Diego, CA (US); Almira Hortensia Niciu-Chiuaru, San Diego, CA (US)

(72) Inventors: Nadeem Mohammed Yusuf Ilkal, Santa Clara, CA (US); Andrew Ernest Goldfinch, San Diego, CA (US); Yi Zhang, San Diego, CA (US); Almira Hortensia Niciu-Chiuaru, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 212 days.

(21) Appl. No.: 15/418,639

(22) Filed: Jan. 27, 2017

(51) Int. Cl.
G06F 21/62 (2013.01)
G06Q 40/00 (2012.01)
H04L 29/06 (2006.01)
G06F 21/60 (2013.01)

(52) U.S. Cl.
CPC ........ *G06F 21/6245* (2013.01); *G06F 21/604* (2013.01); *G06Q 40/12* (2013.12); *H04L 63/0807* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 6,732,100 | B1 * | 5/2004 | Brodersen | G06F 21/6227 |
| 7,103,784 | B1 * | 9/2006 | Brown | G06F 21/6218 |
| | | | | 713/151 |
| 7,305,392 | B1 * | 12/2007 | Abrams | G06Q 10/06 |
| | | | | 707/770 |
| 8,973,106 | B2 * | 3/2015 | Warshavsky | H04L 63/10 |
| | | | | 726/4 |
| 10,116,702 | B2 * | 10/2018 | Knjazihhin | H04L 63/20 |
| 10,122,707 | B2 * | 11/2018 | Fork | G06F 21/33 |
| 10,152,508 | B2 * | 12/2018 | Weissman | G06F 17/30442 |
| 2006/0224590 | A1 * | 10/2006 | Boozer | G06F 17/30067 |
| 2008/0313716 | A1 * | 12/2008 | Park | H04L 63/104 |
| | | | | 726/4 |

(Continued)

OTHER PUBLICATIONS

No stated author; Department of Defense (DoD) Initial Training Guide; 2014; Retrieved from the Internet <URL: https://www.lockheedmartin.com/content/dam/lockheed-martin/eo/documents/employees/DoD-Initial-Training-New-Clearance.pdf>; pp. 1-13, as printed. (Year: 2014).*

(Continued)

*Primary Examiner* — Saleh Najjar
*Assistant Examiner* — Michael W Chao
(74) *Attorney, Agent, or Firm* — Ferguson Braswell Fraser Kubasta PC

(57) ABSTRACT

A method for permission management may include creating a relationship between a client and a firm, receiving, in response to creating the relationship, an assignment of a first role to the firm, receiving, in response to receiving the assignment of the first role, an assignment of a second role to an agent of the firm, and generating, for the agent, a runtime token including token permissions based on the first role and the second role.

20 Claims, 11 Drawing Sheets

(56) References Cited

U.S. PATENT DOCUMENTS

| | | | | |
|---|---|---|---|---|
| 2009/0064303 A1* | 3/2009 | Dickinson | ............... | G06Q 10/06 |
| | | | | 726/10 |
| 2013/0111583 A1* | 5/2013 | Hernandez | .......... | G06F 21/6218 |
| | | | | 726/21 |
| 2013/0198639 A1* | 8/2013 | Casco-Arias Sanchez | .................. | |
| | | | | G06F 21/604 |
| | | | | 715/736 |
| 2014/0059226 A1* | 2/2014 | Messerli | ............... | G06F 9/5072 |
| | | | | 709/226 |
| 2014/0108474 A1* | 4/2014 | David | ..................... | G06F 17/30 |
| | | | | 707/827 |
| 2015/0033327 A1* | 1/2015 | Naglost | ............... | G06F 21/6218 |
| | | | | 726/17 |
| 2017/0063862 A1* | 3/2017 | Guo | ...................... | H04L 63/101 |
| 2018/0232522 A1* | 8/2018 | Shear | .................. | H04L 63/0861 |
| 2018/0314692 A1* | 11/2018 | Kohl | ....................... | G06F 17/30 |

OTHER PUBLICATIONS

No stated author; [MS-PAC]: Privilege Attribute Certificate Data Structure; 2013; Retrieved from the Internet <URL: https://msdn.microsoft.com/en-us/library/cc237917.aspx >; pp. 1-51, as printed. (Year: 2013).*

Tutorial: Delegate Access Across AWS Accounts Using IAM Roles, http://docs.aws.amazon.com/IAM/latest/UserGuide/tutorial_cross-account-with-roles.html, Aug. 6, 2016 (14 pages).

* cited by examiner

MANAGING DELEGATED ACCESS PERMISSIONS

BACKGROUND

Service providers (e.g., accountants) typically require access to client data in order perform their services. Determining access permissions to client data has typically been based on an individual agent's membership in a group (e.g., an accounting firm). Permission management schemes are typically based on representing the relationship between the client and the agent, but do not explicitly represent the group that employs the agent.

Such a failure to represent the group employing the agent may create problems when modeling complex usage scenarios. Ambiguity may be introduced when an agent is employed by multiple accounting firms that provide services to the same client. For example, it may be difficult to determine which accounting firm is responsible for which modifications to client data. In addition, performance issues may arise when multiple agents of an accounting firm perform work for the same client. Furthermore, permission management data may be duplicated, resulting in overhead and a performance burden to synchronize duplicated data, which grows proportionally with the number of agents and the number of clients. For example, when a new agent is added to a firm with thousands of clients, thousands of direct links must be created between the agent and the clients. Also, when a key agent (e.g., an owner, partner, manager, etc.) of an accounting firm is replaced, the permission data may need to be changed for each client of the firm.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for permission management including creating a relationship between a client and a firm, receiving, in response to creating the relationship, an assignment of a first role to the firm, receiving, in response to receiving the assignment of the first role, an assignment of a second role to an agent of the firm, and generating, for the agent, a runtime token including token permissions based on the first role and the second role.

In general, in one aspect, one or more embodiments relate to a system for permission management including a role manager configured to create a relationship between a client and a firm, receive, in response to creating the relationship, an assignment of a first role to the firm, and receive, in response to receiving the assignment of the first role, an assignment of a second role to an agent of the firm. The system further includes a runtime manager configured to generate, for the agent, a runtime token including token permissions based on the first role and the second role. The system further includes a repository, configured to store at least the first role and the second role.

In general, in one aspect, one or more embodiments of the invention relate to a non-transitory computer readable medium including instructions that, when executed by a processor, perform a method for permission management including creating a relationship between a client and a firm, receiving, in response to creating the relationship, an assignment of a first role to the firm, receiving, in response to receiving the assignment of the first role, an assignment of a second role to an agent of the firm, and generating, for the agent, a runtime token including token permissions based on the first role and the second role.

Other aspects of the invention will be apparent from the following description and the appended claims.

DETAILED DESCRIPTION

Figure 1:
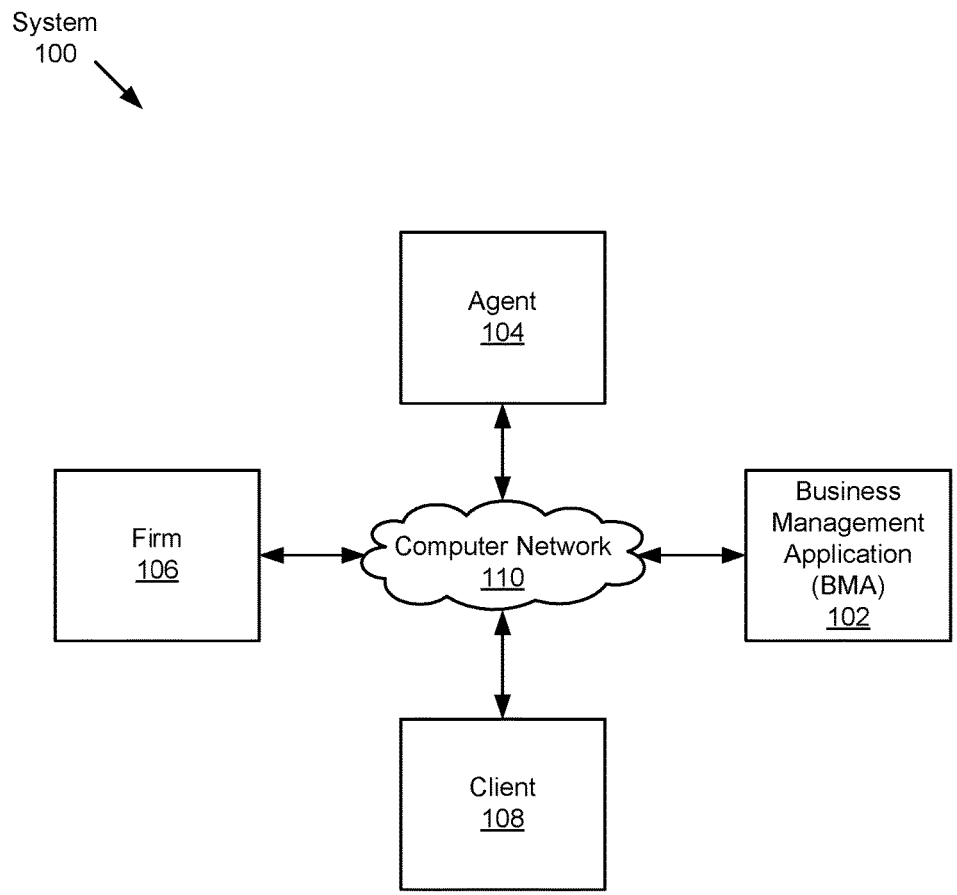
FIG. 1 and FIG. 2 show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention involve managing access permissions for agents using a business management application (BMA) to provide services for a client. The permissions may be derived from roles assigned to a firm (e.g., an accounting firm) by a client, based on a relationship created between the client and the firm. For example, for an accounting firm, the roles may be "accounting", "payroll", "tax preparation", etc. The permissions may be further derived from roles assigned to an agent by a firm, based on a relationship between the firm and the agent. In one or more embodiments of the invention, a client may assign a role directly to an agent (e.g., an agent not employed by a firm). This approach to managing permissions facilitates handling complex use cases that may arise in practice, for example, when agents perform work for the same client on behalf of multiple firms. The client and the firm may assign access permissions in a complementary fashion. For example, the client may assign the maximum permissions for a firm, and the firm may assign and/or restrict the maximum permissions to its various agents, where different agents may be assigned different permissions.

Partitioning the relationship between the client and the agent into: 1) the relationship between the client and the firm, and 2) the relationship between the firm and the agent provides certain advantages. For example, the storage of permissions is compact and non-redundant, since less information is required to model the relationships among clients, firms, and agents. In other words, in accordance with one or more embodiments of the invention, it is unnecessary to store access permissions for each agent relative to each client in multiple places. For example, instead of storing the agent role both at the group (e.g., firm) level and the client level, it is sufficient to store the agent role once, at the group level. In addition, accountability may be clarified so that when an agent performs work for a client, it is clear on behalf of which firm the work was performed. For example, a runtime token may include a reference to the firm, and therefore may be used to support a tracking capability that traces modifications to client data back to a specific firm. Furthermore, when an agent leaves a firm, the agent may continue to perform work for the client on behalf of another firm employing that agent. As another example, changing the ownership of a firm may not affect the permissions derived from the client-firm relationship.

A runtime token (e.g., for a business management application (BMA) that includes client data) may be provided to an agent based on the permissions derived from the client-firm relationship and the firm-agent relationship in accordance with one or more embodiments of the invention. The runtime token may be used to enforce the permissions consistent with the roles assigned by a client to its firms, and the roles assigned by a firm to its agents. For example, the access permissions of an agent performing services for a client on behalf of a firm may be based on the intersection of the access permissions derived from the client-firm relationship, and the access permissions derived from the firm-agent relationship.

FIG. 1 shows a system (100) in accordance with one or more embodiments of the invention. As shown in FIG. 1, the system (100) includes a business management application (BMA) (102), an agent (104), a firm (106), a client (108), and a computer network (110). The computer network (110) may be the network (720) described with respect to FIG. 7B.

In one or more embodiments, the BMA (102) is an accounting application, a tax preparation application, a payroll application, a personnel application, any combination thereof, or any other application for managing an aspect of a business. In one or more embodiments, the BMA (102) is implemented in hardware (e.g., circuitry), software, or any combination thereof. In one or more embodiments, the BMA (102) is accessible over the computer network (110).

In one or more embodiments, the agent (104) is an individual who is part of a group (e.g., a firm (106)). In one or more embodiments, the firm (106) is any business entity that provides products and/or services (e.g., accounting and/or payroll services) to other business entities. In one or more embodiments, the firm (106) provides services for a client (108). In one or more embodiments, the client (108) is any business entity or individual that requests products and/or services from business entities. The agent (104) may be a business owner, an employee, or other person associated with a business entity using the BMA (102) to manage business activities of a business entity (e.g., a firm (106)). For example, the business activities may include accounting activities, personnel activities, payroll activities, etc. In one or more embodiments, the BMA (102) is provided by an application service provider, such as a software as a service (SaaS) provider. For example, the BMA (102) may be a SaaS accessed by the agent (104) on a subscription basis. In one or more embodiments, the client (108) may access the BMA (102) to enter data that may be used by the agent (104).

Figure 2:
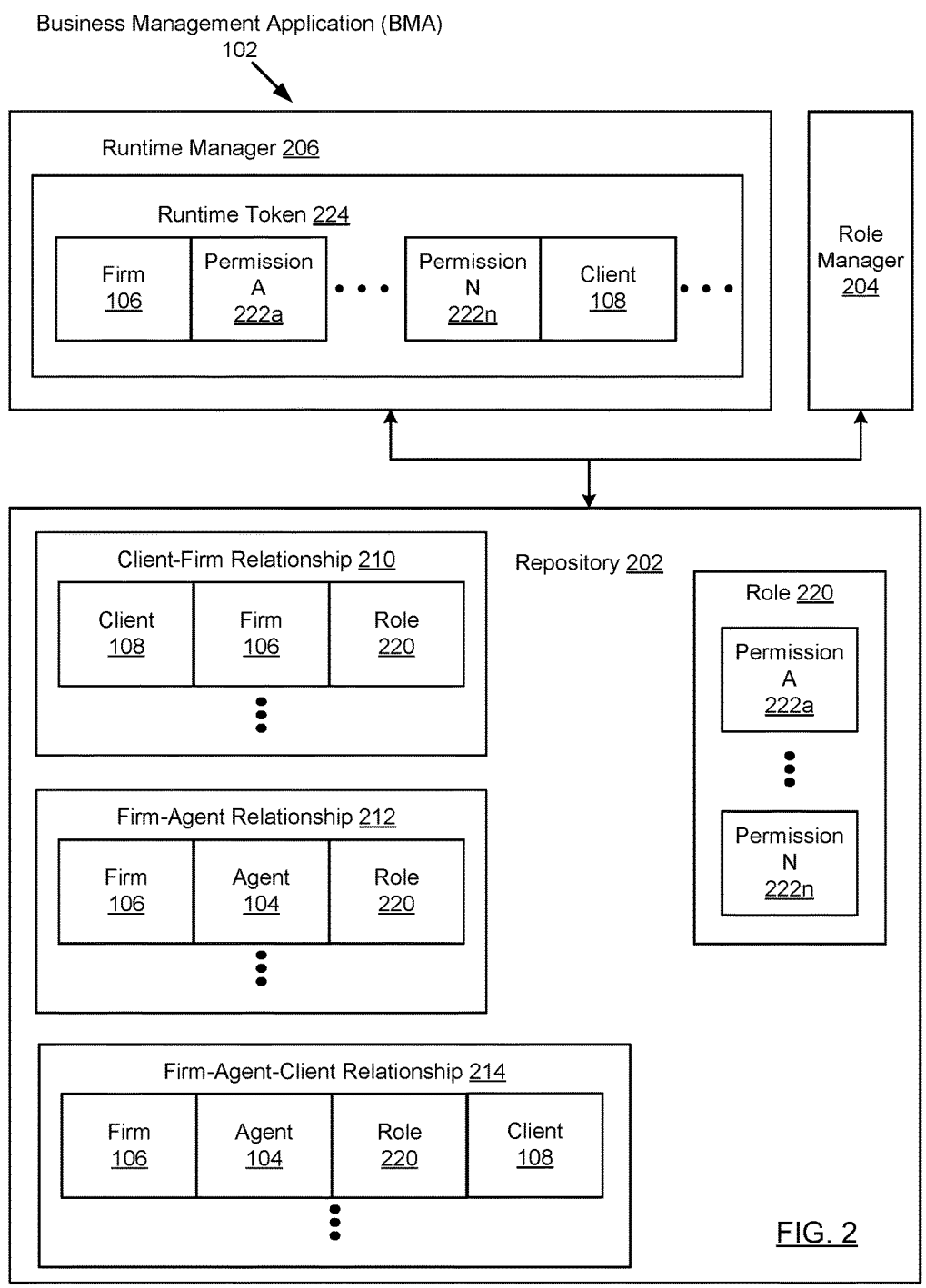

Turning to FIG. 2, in one or more embodiments, the BMA (102) includes a repository (202), a role manager (204), and a runtime manager (206). In one or more embodiments, the repository (202) is any type of storage unit and/or device (e.g., a file system, database, collection of tables, or any other storage mechanism) for storing data. Further, the repository (202) may include multiple different storage units and/or devices. The multiple different storage units and/or devices may or may not be of the same type or located at the same physical site.

In one or more embodiments, the repository (202) includes, maintains, and/or tracks client-firm relationships (210), firm-agent relationships (212), firm-agent-client relationships (214), and roles (220). In one or more embodiments, a client-firm relationship (210) represents one or more roles (220) assigned to a firm (106) by a client (108). A role (220) assigned to a firm (106) by a client (108) may be referred to as a "firm role". In one or more embodiments, a client-firm relationship (210) is based on communication between a client (108) and a firm (106) regarding services to be provided by the firm (106) to the client (108), and the roles (220) corresponding to those services. For example, a client (108) may assign roles (220) for accounting, payroll, and/or tax preparation to a firm (106).

In one or more embodiments, a firm-agent relationship (212) represents one or more roles (220) assigned to an agent (104) by a firm (106). A role (220) assigned to an agent (104) by a firm (106) may be referred to as an "agent role". In one or more embodiments, a firm-agent relationship (212) is based on the skills of an agent (104), as well as a level of trust the firm (106) has in the agent (104). For example, a firm (106) may assign roles (220) for accounting and tax preparation to one agent (104), and the firm (106) may assign roles (220) for accounting and payroll to a second agent (104). In one or more embodiments, the firm-agent relationship (212) represents the level of access that an agent (104) has to data within the firm (106). For example, the firm-agent relationship (212) may indicate whether an agent (104) is permitted to add other agents (104) to the firm (106).

In one or more embodiments, a firm-agent-client relationship (214) represents one or more roles (220) assigned to an agent (104) by a firm (106), relative to a client (108). That is, the firm-agent-client relationship (214) indicates what access an agent (104) has to a specific client (108) of the firm (106).

Partitioning the relationship between a client (108) and an agent (104) into a client-firm relationship (210) and a firm-agent relationship (212) may provide a more easily maintained, non-redundant representation than explicitly representing each client-agent relationship. For example, roles (220) assigned by a firm (106) to an agent (104) may be revised (e.g., terminated) without impacting roles (220) assigned by a client (108) to a firm (106), and vice versa.

Partitioning the relationship between a client (108) and an agent (104) into a client-firm relationship (210) and a firm-agent relationship (212) provides a flexible representation of clients, firms, and agents. For example, an agent (104) may be authorized by a first firm (106) to perform an accounting role (220), and the agent (104) may be authorized by a second firm (106) to perform a payroll role (220). Therefore, terminating the client-firm relationship (210) between the client (108) and the first firm (106) would not preclude the agent (104) from continuing to perform the role (220) corresponding to the client-firm relationship (210) between the client (108) and the second firm (106).

In one or more embodiments, a client-agent relationship (not shown) represents one or more roles (220) assigned directly to an agent (104) by a client (108). That is, an agent (104) may perform work for a client (108) without being associated with a firm (106), in which case the client (108) and agent (104) may directly form a relationship, and the client (108) may assign roles (220) directly to the agent (104).

In one or more embodiments, each role (220) includes one or more permissions (222a-222n). In one or more embodiments, each permission (222a-222n) provides access to a resource (e.g., data, programs) of the BMA (102). For example, an accounting role may include permissions (222a-222n) to access a ledger, invoices, and/or checks of the BMA (102). In one or more embodiments, a specific permission (222a-222n) may be included in multiple roles (220).

In one or more embodiments, the role manager (204) includes functionality to access and update various data included in the repository (202), including client-firm relationships (210), firm-agent relationships (212), and roles (220). For example, the role manager (204) may update a client-firm relationship (210) based on a new or modified (e.g., terminated) assignment of a role (220) to a firm (106). Similarly, the role manager (204) may update the firm-agent relationships (212) based on a new or modified assignment of a role (220) to an agent (104). In one or more embodiments, the role manager (204) includes functionality to update the set of permissions (222a-222n) associated with a role (220). In one or more embodiments, the role manager (204) includes functionality to notify the runtime manager (206) of a change to various data included in the repository (202), including the client-firm relationships (210), firm-agent relationships (212), and roles (220).

Continuing with FIG. 2, in one or more embodiments, the runtime manager (206) may execute the BMA (102). In one or more embodiments, the runtime manager (206) provides various support services during execution of the BMA (102), including generating a runtime token (224).

In one or more embodiments, a runtime token (224) is a piece of data used in network communications (e.g., transmitted using the HyperText Transfer Protocol (HTTP)) to identify a runtime session. In one or more embodiments, the runtime token (224) may encapsulate the security (e.g., permissions (222a-222n)) of a process or thread. In one or more embodiments, the runtime token (224) includes one or more firms (106), each having one or more permissions (222a-222n). In one or more embodiments, the runtime token (224) may contain the permissions (222a-222n) associated with a firm (106), relative to one or more clients (108) of the firm (106). In one or more embodiments, a runtime token (224) may be used by an agent (104) to access data of a client (108), on behalf of a firm (106). Including the firm (106) in the runtime token (224) supports traceability of changes to the data of a client (108). For example, the firm (106) included in the runtime token (224) may support a logging feature that tracks on behalf of which firm (106) data of the client (108) has been changed.

In one or more embodiments, the permissions (222a-222n) included in the runtime token (224) are derived from two sources:
  a. The roles (220) of the client-firm relationship (210) between the client (108) and the firm (106); and
  b. The roles (220) of the firm-agent relationship (212) between the firm (106) and the agent (104).

In one or more embodiments, the agent (104) is not acting on behalf of a firm (106), in which case the runtime token (224) simply includes one or more permissions (222a-222n) (e.g., derived from the roles (220) of a client-agent relationship, as described above), without referencing a firm (106). In one or more embodiments, the permissions (222a-222n) included in the runtime token (224) are the intersection of the permissions (222a-222n) corresponding to the roles (220) derived from the two sources listed above.

Continuing with FIG. 2, in one or more embodiments of the invention, the runtime manager (206) includes functionality to initiate a session for an agent (104) to use the BMA (102). The runtime manager (206) may also include functionality to generate and/or modify a runtime token (224) for use by the agent (104) during the session. In one or more embodiments, the runtime manager (206) includes functionality to decode a runtime token (224). In one or more embodiments, the runtime manager (206) includes functionality to cache a runtime token (224) in memory (e.g., for short durations, in order to improve performance). In one or more embodiments, the runtime manager (206) includes functionality to access the repository (202) to retrieve roles (220) corresponding to client-firm relationships (210) and/or firm-agent relationships (212). In one or more embodiments, the runtime manager (206) includes functionality to access the repository (202) to retrieve permissions (222a-222n) corresponding to a role (220). The runtime manager (206) may also include functionality to process requests to access data of a client (108) by the agent (104) in the context of the runtime token (224) used by the agent (104) during the session.

While FIG. 1 and FIG. 2 show a configuration of components, other configurations may be used without departing from the scope of the invention. For example, various components may be combined to create a single component. As another example, the functionality performed by a single component may be performed by two or more components.

Figure 3:
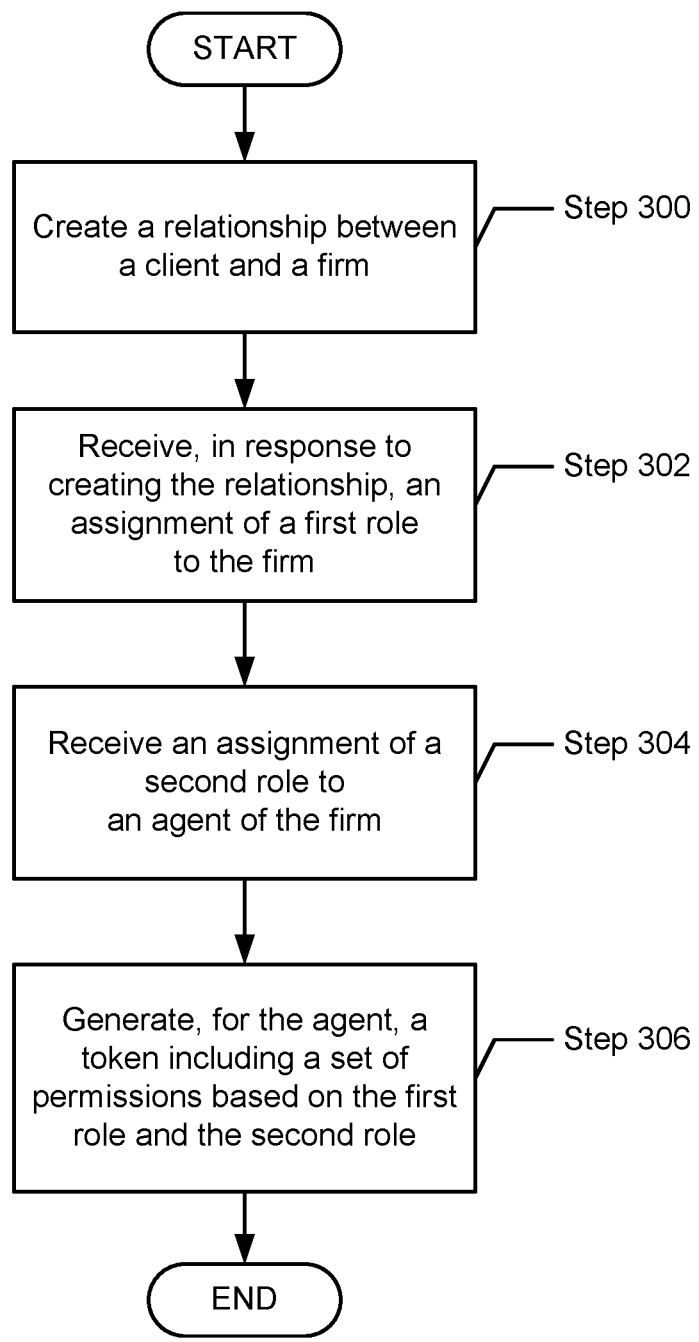
FIG. 3, FIG. 4, and FIG. 5 show a flowchart of a process in accordance with one or more embodiments of the invention.

FIG. 3 shows a flowchart in accordance with one or more embodiments of the invention. The flowchart depicts a process for permission management. In one or more embodiments, the process described in reference to FIG. 3 is practiced using the system (100) described in reference to FIG. 1 and FIG. 2 above, and/or involving the computing system (700) described in reference to FIG. 7A, and/or the client device (726) described in reference to FIG. 7B. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, a relationship between a client and a firm is created. In one or more embodiments, the relationship is created (e.g., by the role manager described above) in response to a series of messages exchanged between the client and the firm. For example, the client may initiate the series of messages by sending a message to the firm requesting services corresponding to one or more roles (e.g., accounting, payroll, tax preparation). Alternatively, the firm may initiate the series of messages by sending a solicitation for new business to the client. The series of messages may conclude with the client and the firm agreeing that one or more products and/or services will be provided by the firm to the client based on specific roles assigned to the firm by the client. In one or more embodiments, it is unnecessary for the client to have access to a unique identifier of the firm in order to form a client-firm relationship with the firm.

In Step 302, an assignment of a first role to the firm is received. The assignment of the first role may be received in response to creating the relationship. In one or more embodiments, the first role is derived from the relationship. For example, the first role may be "accounting", "payroll", "tax preparation", or any other role corresponding to a type of product and/or service to be provided by the firm to the client in the context of the relationship. In one or more embodiments, the first role may be received by the role manager from the client (e.g., by an administrator of the client). In one or more embodiments, the first role may be assigned by the firm (e.g., by an administrator of the firm).

In one or more embodiments, the first role includes one or more permissions. In one or more embodiments, each permission provides access to a resource (e.g., client data, programs) of the BMA. For example, an accounting role may include permissions to access a ledger, invoices, and checks of the BMA.

In Step 304, an assignment of a second role to an agent of the firm is received. The assignment of the second role may be received in response to receiving the assignment of the first role. For example, the second role may be "accounting", "payroll", "tax preparation", or any other role performed by the agent on behalf of the firm. In one or more embodiments, the second role is derived from a firm-agent relationship that represents one or more roles assigned to the agent by the firm. In one or more embodiments, the second role is assigned by the firm (e.g., by an administrator of the firm). In one or more embodiments, the second role includes one or more permissions.

In Step 306, a runtime token is generated (e.g., by the runtime manager described above) for the agent, including a set of token permissions based on the first role and the second role. For example, the permissions corresponding to the first role and the second role may be obtained from a repository indicating the permissions corresponding to each role. In one or more embodiments, the runtime token is used by the agent to access data of the client in the BMA, on behalf of the firm, in accordance with the permissions derived from the first role and the second role. In one or more embodiments, the permissions included in the runtime token may be the intersection of the permissions corresponding to the first role and the second role. In one or more embodiments, the permissions included in the runtime token may be calculated according to different policies for combining the permissions corresponding to the first role and the second role. For example, certain agents of a firm (e.g., a lead agent, an owner agent, etc.) may be assigned additional permissions under specific circumstances and/or corresponding to specific roles.

In one or more embodiments, the runtime token includes a reference to the firm, in order to clarify the context (e.g., on which firm's behalf) in which an agent is attempting to access data of a client, via the runtime token.

Figure 4:
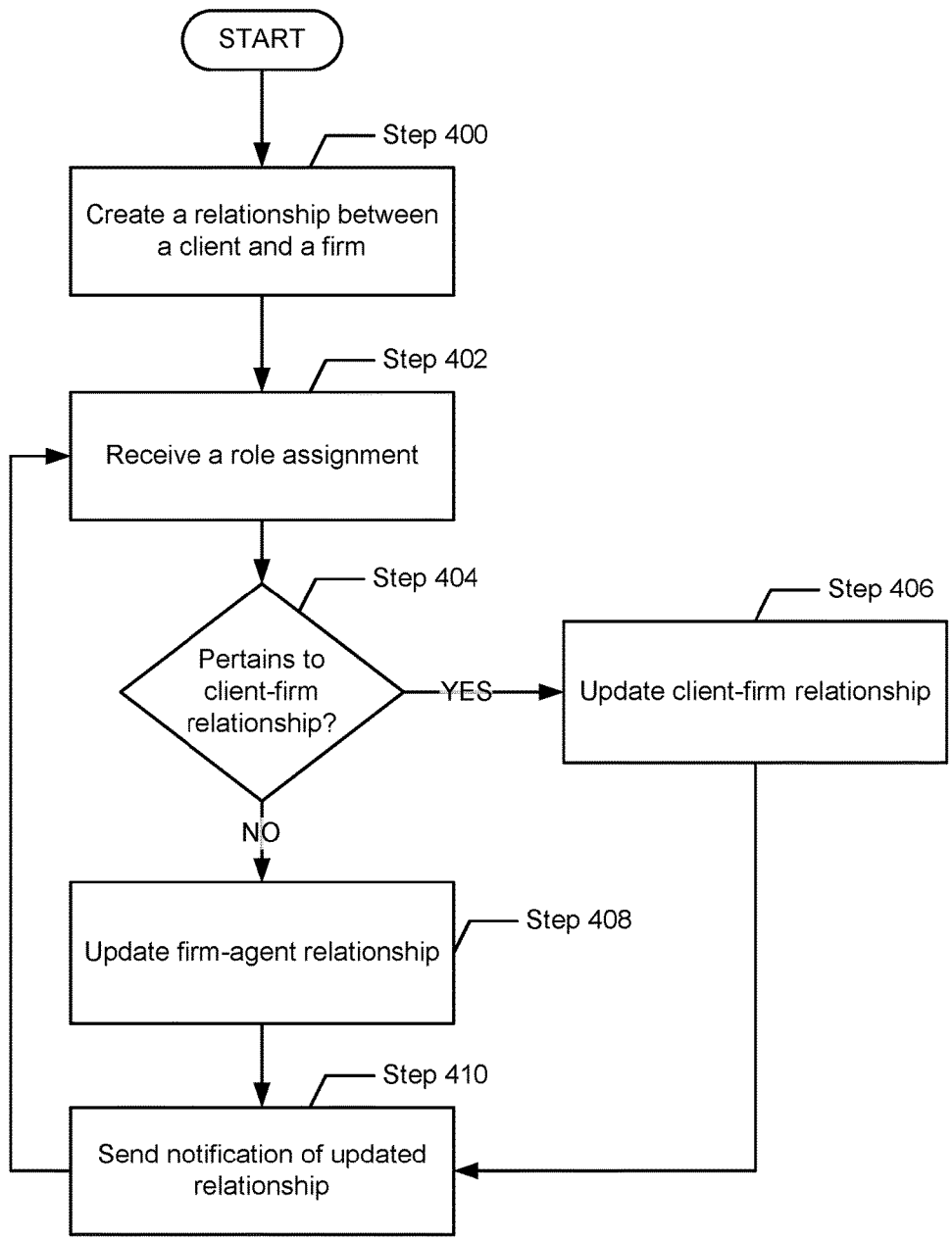

FIG. 4 shows a flowchart in accordance with one or more embodiments of the invention. The flowchart depicts a process for role management. In one or more embodiments, the process described in reference to FIG. 4 may be practiced using one or more components described in reference to FIG. 1 and FIG. 2 above (e.g., the role manager (204) described in reference to FIG. 2), and/or involving the computing system (700) described in reference to FIG. 7A, and/or the client device (726) described in reference to FIG. 7B. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, in Step 400, a relationship between a client and a firm is created in a manner similar to that described above with regard to Step 300 in FIG. 3.

In Step 402, a role assignment is received. In one or more embodiments, the role assignment pertains to a client-firm relationship (see description above of Step 302 in FIG. 3). In one or more embodiments, the role assignment pertains to a firm-agent relationship (see description above of Step 304 in FIG. 3).

If, in Step 404, it is determined that the role assignment pertains to a client-firm relationship, then in Step 406 the client-firm relationship is updated. In one or more embodiments, the client-firm relationship is updated in the repository. For example, the role assignment may add an accounting role to a new client-firm relationship. Alternatively, the role assignment may add a new role to an existing client-firm relationship. Still alternatively, the role assignment may remove a firm role from an existing client-firm relationship.

Otherwise, if Step 404 determines that the role assignment does not pertain to a client-firm relationship (i.e., the role assignment pertains to a firm-agent relationship), then in Step 408 the firm-agent relationship is updated. In one or more embodiments, the firm-agent relationship is updated in the repository. For example, the role assignment may add a new agent role (e.g., a tax preparation role) to a new firm-agent relationship. Alternatively, the role assignment may add a new agent role to an existing firm-agent relationship. Still alternatively, the role assignment may remove an agent role from an existing firm-agent relationship.

In one or more embodiments, the role assignment pertains to a client-agent relationship where a role is directly assigned to an agent by a client. That is, the agent may be operating independently of any firm.

In Step 410, a notification of the updated relationship (described in Step 406 or Step 408 above) is sent. In one or more embodiments, the notification is sent to the runtime manager (e.g., to ensure that ongoing access to the data of the BMA is consistent with the role assignment received in Step 400 above). In one or more embodiments, a notification is sent when the permissions associated with a role are modified. For example, a new permission corresponding to a new data file and/or a new feature of the BMA may be associated with an existing role.

Execution then resumes with Step 402 above, in order to receive the next role assignment.

Figure 5:
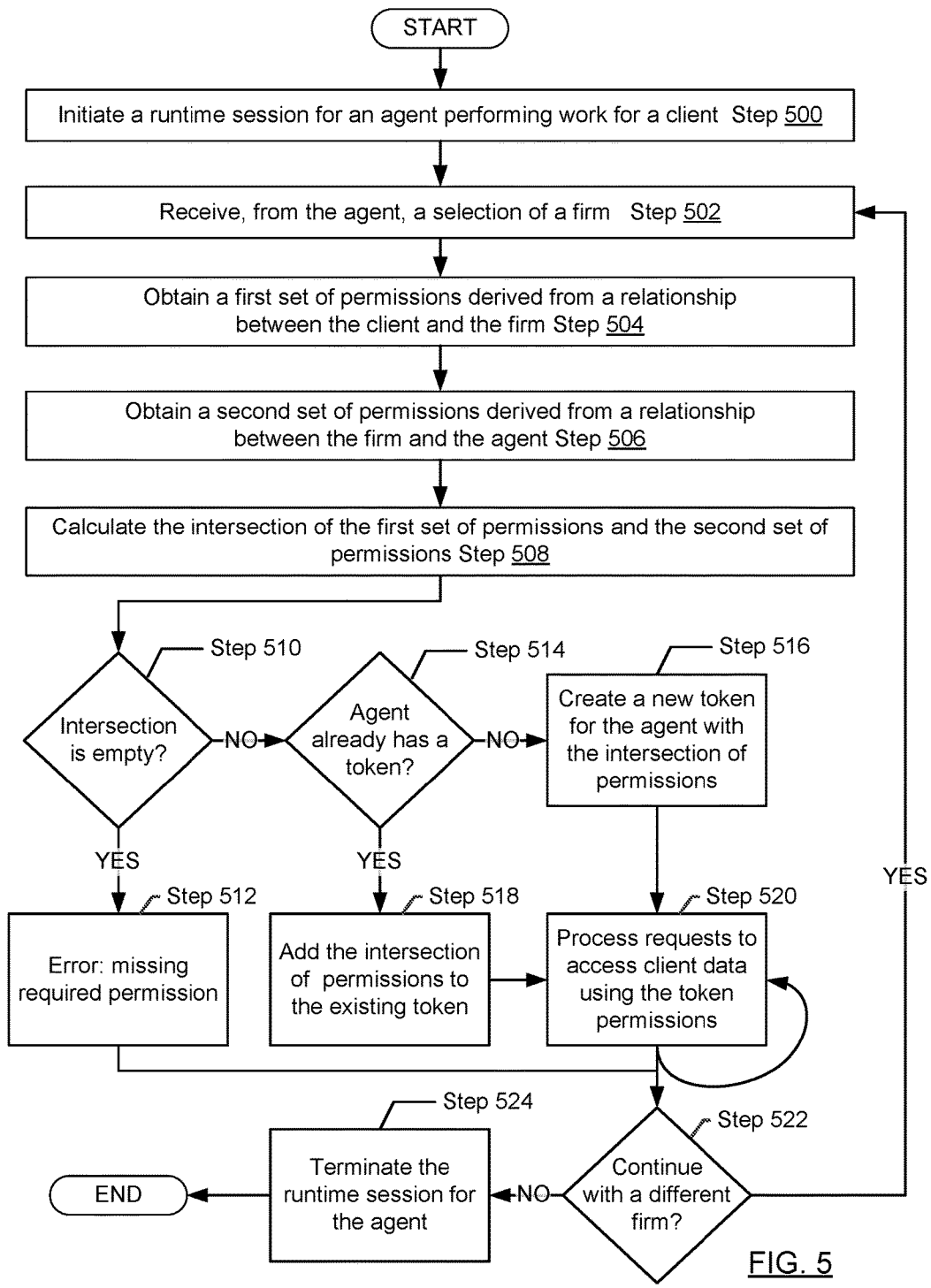

FIG. 5 shows a flowchart in accordance with one or more embodiments of the invention. The flowchart depicts a process for runtime permission management. In one or more embodiments, the process described in reference to FIG. 5 may be practiced using one or more components described in reference to FIG. 1 and FIG. 2 above (e.g., the runtime manager (206) described in reference to FIG. 2), and/or involving the computing system (700) described in reference to FIG. 7A, and/or the client device (726) described in reference to FIG. 7B. In one or more embodiments of the invention, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Initially, in Step 500, a runtime session is initiated for an agent performing work for a client. In one or more embodiments, the runtime session is initiated when the agent logs into the BMA. In one or more embodiments, the agent selects the client for which the agent will be performing work for during the runtime session.

In Step 502, a selection of a firm is received from the agent. In one or more embodiments, the selected firm is assigned one or more firm roles by the client, as indicated in a client-firm relationship between the client and the firm. In one or more embodiments, the agent have been assigned one or more agent roles by the selected firm, as indicated in a firm-agent relationship between the firm and the agent.

In Step 504, a first set of permissions is obtained from the client-firm relationship between the client and the firm. In one or more embodiments, each firm role indicated in the client-firm relationship is associated with one or more permissions. For example, an accounting role may be associated with permissions to access a ledger, invoices, checks, etc. In one or more embodiments, the first set of permissions represents the maximum permissions accessible to the firm to perform work for the client, in the context of one or more firm roles.

In Step 506, a second set of permissions is obtained from the firm-agent relationship between the firm and the agent. In one or more embodiments, each agent role indicated in the firm-agent relationship is associated with one or more permissions. In one or more embodiments, the agent permissions represent the maximum permissions accessible to the agent to perform work for the firm, in the context of one or more agent roles.

In Step 508, the intersection of the first set of permissions and the second set of permissions is calculated. In one or more embodiments, the intersection represents the permissions associated with the agent roles indicated in the firm-agent relationship that are also associated with the firm roles indicated in the client-firm relationship.

If, in Step 510, the intersection is determined to be empty, then an error is flagged in Step 512. For example, it may be the case that the agent selected the firm in Step 502 by mistake. That is, the agent may not have been assigned an agent role by the selected firm that is compatible with the firm role(s) assigned by the client to the selected firm.

In one or more embodiments, once the error is flagged in Step 512, execution then continues in Step 522 by prompting the agent if he/she wishes to continue the session using a different firm. If not, then in Step 524 the runtime session is terminated (e.g., the agent may request a new runtime session to perform work for a different client). Otherwise, execution continues with Step 502 above, using a new firm selected by the agent.

In one or more embodiments, the existing client-firm relationships and firm-agent relationships are examined in order to present a list of alternate firm selections to the agent. Then, the agent may make, in Step 502 above, a new selection from the list of alternate firm selections. For example, an alternate firm may be added to the list of alternate firm selections if there is a non-empty intersection between the permissions associated with the firm roles indicated in the client-firm relationship between the client and the alternate firm, and the permissions associated with the agent roles indicated in the firm-agent relationship between the alternate firm and the agent.

If, in Step 510, the intersection is determined to be non-empty, then Step 514 determines whether a runtime token has already been generated for the agent. If no runtime token has yet been generated, then in Step 516 a runtime token is generated for the agent that includes the intersection of permissions calculated in Step 508 above. In one or more embodiments, the runtime token may include a reference to the selected firm (e.g., to support a logging capability that traces modifications to data of a client to the firm on whose behalf the data was modified).

In Step 520, requests to access data of the client by the agent are processed using the permissions associated with the runtime token. For example, an accountant acting in an "accounting" role may access and/or modify files containing ledgers, invoices, checks, sales, etc., consistent with the permissions associated with the runtime token.

In one or more embodiments, while processing requests to access data during the execution of Step 520, a change to a relationship (e.g., the modification or termination of a client-firm relationship or a firm-agent relationship) may be detected (e.g., see description of Step 410 above), which may affect the permissions included in the runtime token. For example, in response to receiving a notification of a changed relationship, the permissions of the runtime token may be adjusted to be consistent with the changed relationship. In one or more embodiments, the role manager may be polled to check for updates to the client-firm relationship between the client and the firm and/or updates to the firm-agent relationship between the firm and the agent.

For example, if a new role is added to a client-firm relationship and a firm-agent relationship, then additional permissions may be included in the runtime token. Alternatively, if a role is removed from a client-firm relationship or a firm-agent relationship (e.g., the relationship itself is terminated), then permissions may be removed from the runtime token. If all permissions have been removed from the runtime token, then execution continues with Step 522, to offer the agent the option of continuing work on behalf of a different firm.

In one or more embodiments, a change to the permissions associated with a role may be detected. In response to detecting the changed permissions, the permissions of the runtime token may be adjusted to be consistent with the changed permissions.

Once the agent has completed work for the client in the context of the selected firm, in Step 522, the agent is prompted to continue working for the client in the context of a different firm. That is, the agent may also be part of a second firm that has assigned the agent a role (e.g., in the context of a firm-agent relationship), where the second firm has also been assigned a role by the client (e.g., in the context of a client-firm relationship). If the agent decides to continue working for the client with a different firm, then execution resumes in Step 502 above, where the agent selects another firm, and another iteration of the loop from Step 502 to Step 522 is executed.

In one or more embodiments, the agent is presented with the option to continue working for the client without the context of any firm, if a direct client-agent relationship exists between the client and the agent. In such a direct client-agent relationship scenario, the permissions of the runtime token may be derived directly from the role associated with the client-agent relationship.

If Step 514 above determines that a runtime token has already been generated for the agent, then in Step 518 the intersection of permissions calculated in Step 508 above is added to the runtime token. That is, if the agent has already been using the runtime token to access data of the client (e.g., in the context of a different firm), the permissions derived from the firm-agent relationship of the selected firm may be added to the existing runtime token. In one or more embodiments, if the lifetime of the already-generated runtime token has expired, then the previously calculated permissions associated with the runtime token are updated, which may result in adding or removing permissions.

After Step 518 is performed, execution continues with Step 520 above (e.g., to continue processing requests from the agent to access data of the client).

The following example is for explanatory purposes only and not intended to limit the scope of the invention. FIG. 6A, FIG. 6B, FIG. 6C, FIG. 6D, and FIG. 6E show an implementation example in accordance with one or more embodiments of the invention.

Figure 6A:
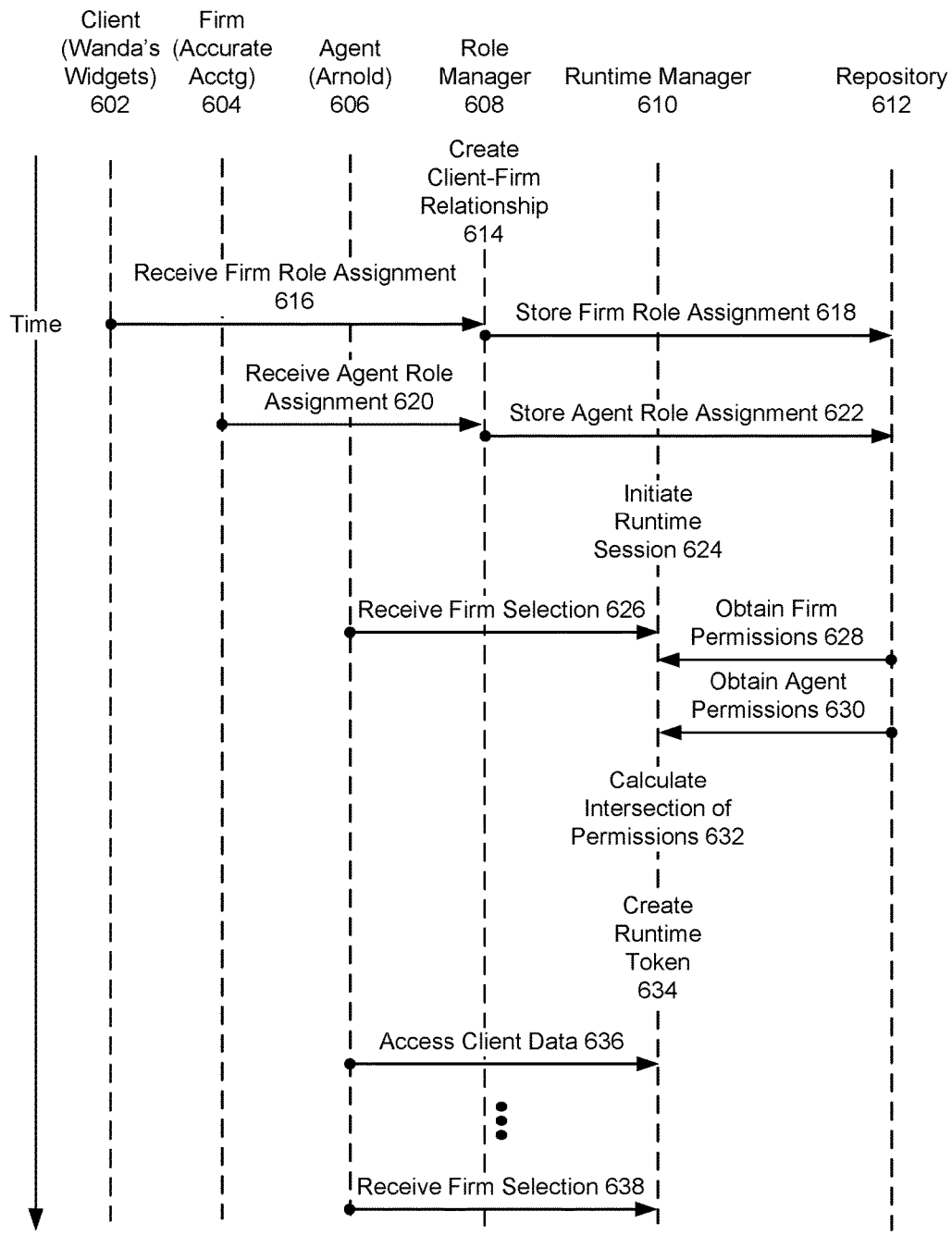
FIG. 6A, FIG. 6B, FIG. 6C, FIG. 6D, and FIG. 6E show examples in accordance with one or more embodiments of the invention.

FIG. 6A illustrates, in accordance with one or more embodiments, the relative timing of steps performed by one or more components described in reference to FIG. 1 and FIG. 2, in accordance with the flowcharts in FIG. 3, FIG. 4, and FIG. 5. These components include: Wanda's Widgets, a client (602) ((108) in FIG. 1), Accurate Accounting, a firm (604) ((106) in FIG. 1), Arnold, an agent (606) ((104) in FIG. 1), a role manager (608) ((204) in FIG. 2), a runtime manager (610) ((206) in FIG. 2), and a repository (612) ((202) in FIG. 2).

Initially, in Step 614, the role manager (608) creates a client-firm relationship between Wanda's Widgets (602) and Accurate Accounting (604). The role manager (608) creates the client-firm relationship in response to a series of messages exchanged between Wanda's Widgets (602) and Accurate Accounting (604) that determine which roles are assigned by Wanda's Widgets (602) to Accurate Accounting (604).

Figure 6B:
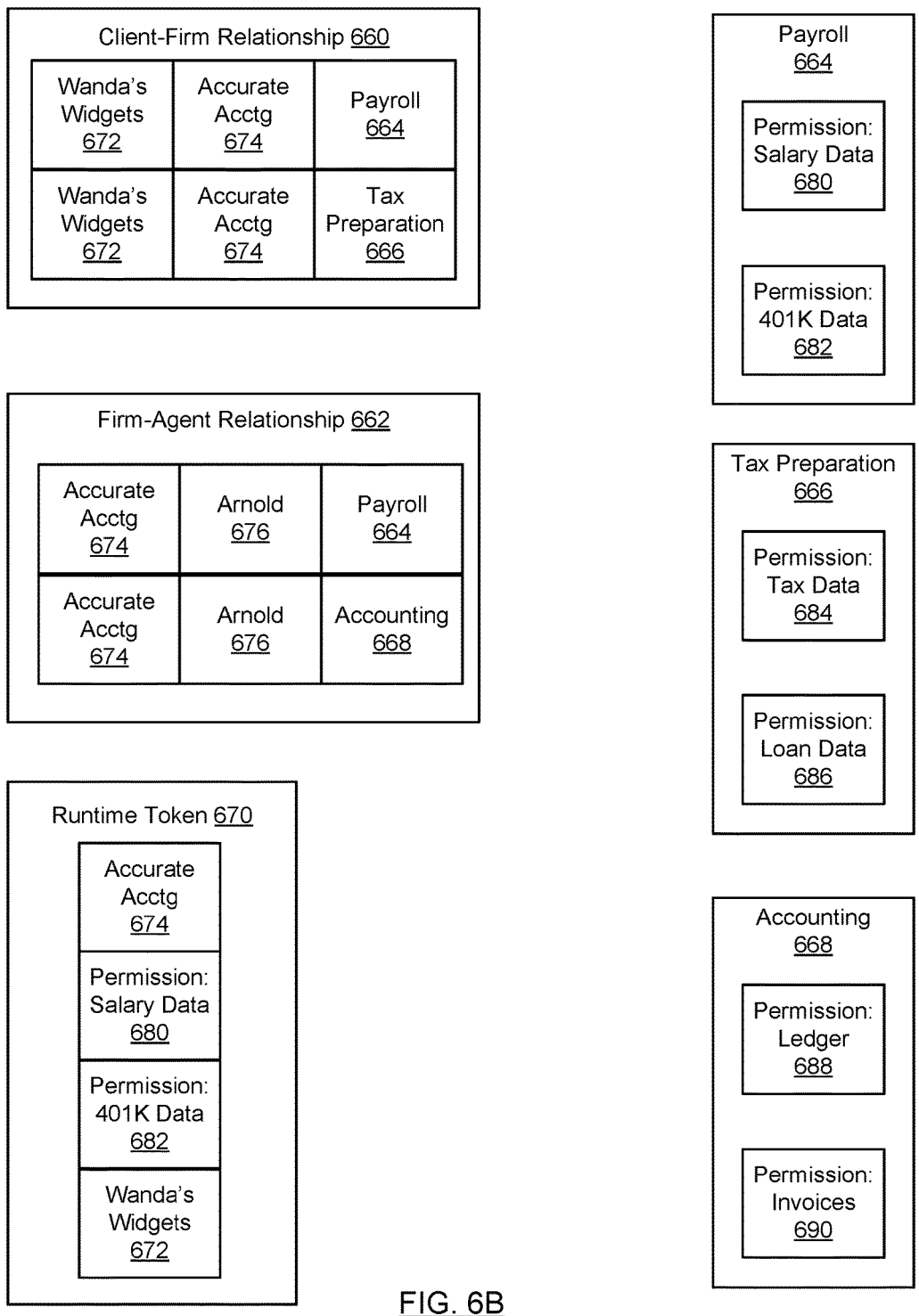

In Step 616, the role manager (608) receives firm role assignments from Wanda's Widgets (602) that assign the roles of "payroll" and "tax preparation" to Accurate Accounting (604). Then, in Step 618, the role manager (608) stores the roles of "payroll" and "tax preparation" in the client-firm relationship between Wanda's Widgets (602) and Accurate Accounting (604) in the repository (612). FIG. 6B illustrates the client-firm relationship (660) between Wanda's Widgets (672) and Accurate Accounting (674). That is, FIG. 6B shows that Wanda's Widgets (672) has assigned the roles of payroll (664) and tax preparation (666) to Accurate Accounting (674).

Returning to FIG. 6A, in Step 620, the role manager (608) receives agent role assignments from Accurate Accounting (604) that assign the roles of "payroll" and "accounting" to Arnold (606). Then, in Step 622, the role manager (608) stores the roles of "payroll" and "accounting" in the firm-agent relationship between Accurate Accounting (604) and Arnold (606) in the repository (612). FIG. 6B illustrates the firm-agent relationship (662) between Accurate Accounting (674) and Arnold (676), showing that Accurate Accounting (674) has assigned the roles of payroll (664) and accounting (668) to Arnold (676).

Returning to FIG. 6A, in Step 624, the runtime manager (610) initiates a runtime session for Arnold (606). The runtime session is initiated in response to a request from Arnold (606) to perform work for Wanda's Widgets (602).

In Step 626, the runtime manager (610) receives a selection of Accurate Accounting (604) from Arnold (606). That is, Arnold (606) will be performing work for Wanda's Widgets (602) on behalf of Accurate Accounting (604) during this runtime session.

In Step 628, the runtime manager (610) obtains the firm permissions corresponding to the client-firm relationship between Wanda's Widgets (602) and Accurate Accounting (604) from the repository (612). FIG. 6B shows that two roles are indicated in this client-firm relationship (660): payroll (664) and tax preparation (666). FIG. 6B shows that the role of payroll (664) is associated with permissions to access salary data (680) and 401K data (682), and the role of tax preparation (666) is associated with permissions to access tax data (684) and loan data (686).

Returning to FIG. 6A, in Step 630, the runtime manager (610) obtains the agent permissions corresponding to the firm-agent relationship between Accurate Accounting (604) and Arnold (606) from the repository (612). FIG. 6B shows that two roles are indicated in this firm-agent relationship (662): payroll (664) and accounting (668). FIG. 6B shows that the role of payroll (664) is associated with permissions to access salary data (680) and 401K data (682), and the role of accounting (668) is associated with permissions to access a ledger (688) and invoices (690).

Returning to FIG. 6A, in Step 632, the runtime manager (610) calculates the intersection of the firm permissions obtained in Step 628 and the agent permissions obtained in Step 630. In this case, the intersection includes the permissions to access salary data and 401K data that are associated with the payroll role.

In Step 634, the runtime manager (610) creates a runtime token that includes the permissions calculated in Step 632 above. FIG. 6B shows that the runtime token (670) includes permissions to access salary data (680) and 401K data (682). The runtime token (670) also includes a reference to Accurate Accounting (674) (e.g., to facilitate tracing any modifications to the data of Wanda's Widgets (602) by Arnold (606) back to Accurate Accounting (604), in order to clarify the accountability for any such data modifications). The runtime token (670) also indicates that the permissions are relative to the client Wanda's Widgets (672).

Returning to FIG. 6A, in Step 636, the runtime manager (610) processes requests to access data of Wanda's Widgets (602) by Arnold (606) using the permissions associated with the runtime token. Eventually, Arnold (606) finishes working on Wanda's Widgets (602) on behalf of Accurate Accounting (604).

In Step 638, the runtime manager (610) receives a selection of a different firm, Quick Quants (not shown), from Arnold (606). That is, Arnold (606) now wishes to perform work for Wanda's Widgets (602) on behalf of Quick Quants.

Figure 6C:
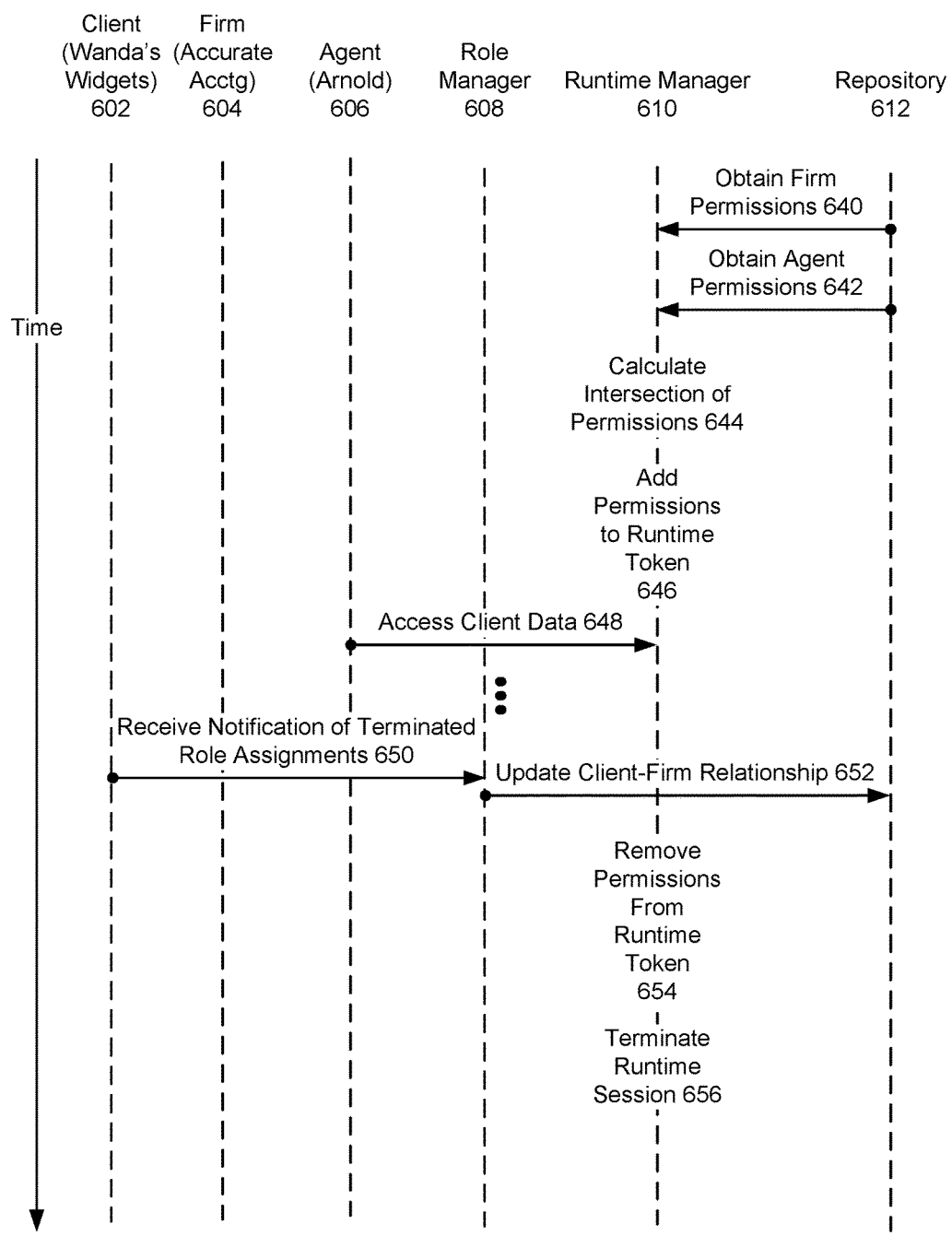
Figure 6D:
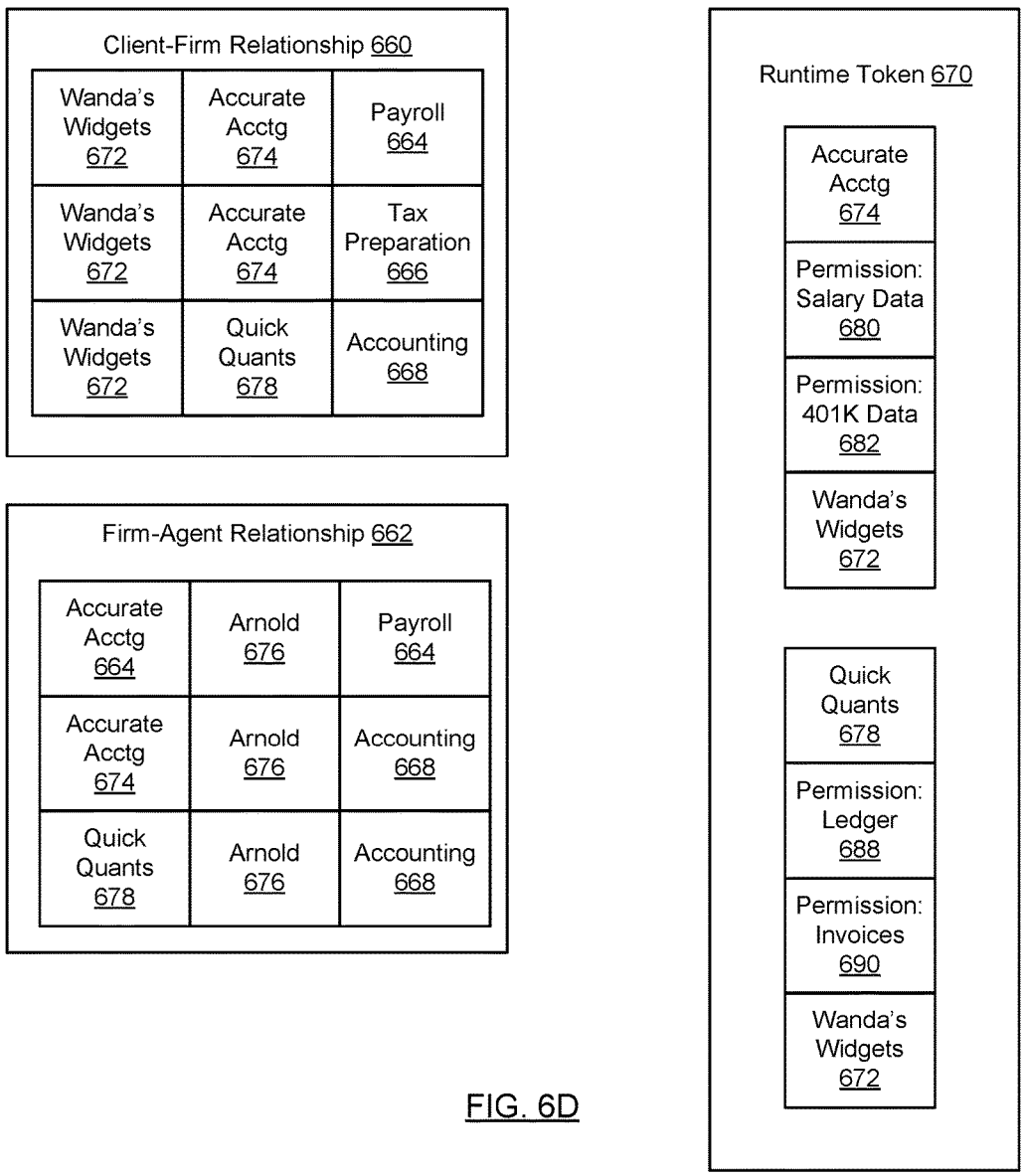

Turning to FIG. 6C, in Step 640, the runtime manager (610) obtains the firm permissions corresponding to a pre-existing client-firm relationship between Wanda's Widgets (602) and Quick Quants from the repository (612). FIG. 6D shows that one role is indicated in this client-firm relationship (660): accounting (668). As previously described above, and returning to FIG. 6B, the role of accounting (668) is associated with permissions to access a ledger (688) and invoices (690).

Returning to FIG. 6C, in Step 642, the runtime manager (610) obtains the agent permissions corresponding to a pre-existing firm-agent relationship between Quick Quants and Arnold (606) from the repository (612). FIG. 6D shows that one role is indicated in the firm-agent relationship (662) between Quick Quants (678) and Arnold (676): accounting (668).

Returning to FIG. 6C, in Step 644, the runtime manager (610) calculates the intersection of the firm permissions obtained in Step 640 and the agent permissions obtained in Step 642. In this case, the intersection includes the permissions to access the ledger and invoices that are associated with the accounting role.

In Step 646, the runtime manager (610) updates the runtime token to include the permissions calculated in Step 644 above. FIG. 6D shows that the runtime token (670) now includes permissions to access the ledger (688) and invoices (690), on behalf of Quick Quants (678).

Returning to FIG. 6C, in Step 648, the runtime manager (610) processes requests to access data of Wanda's Widgets (602) by Arnold (606) using the permissions associated with the runtime token.

Figure 6E:
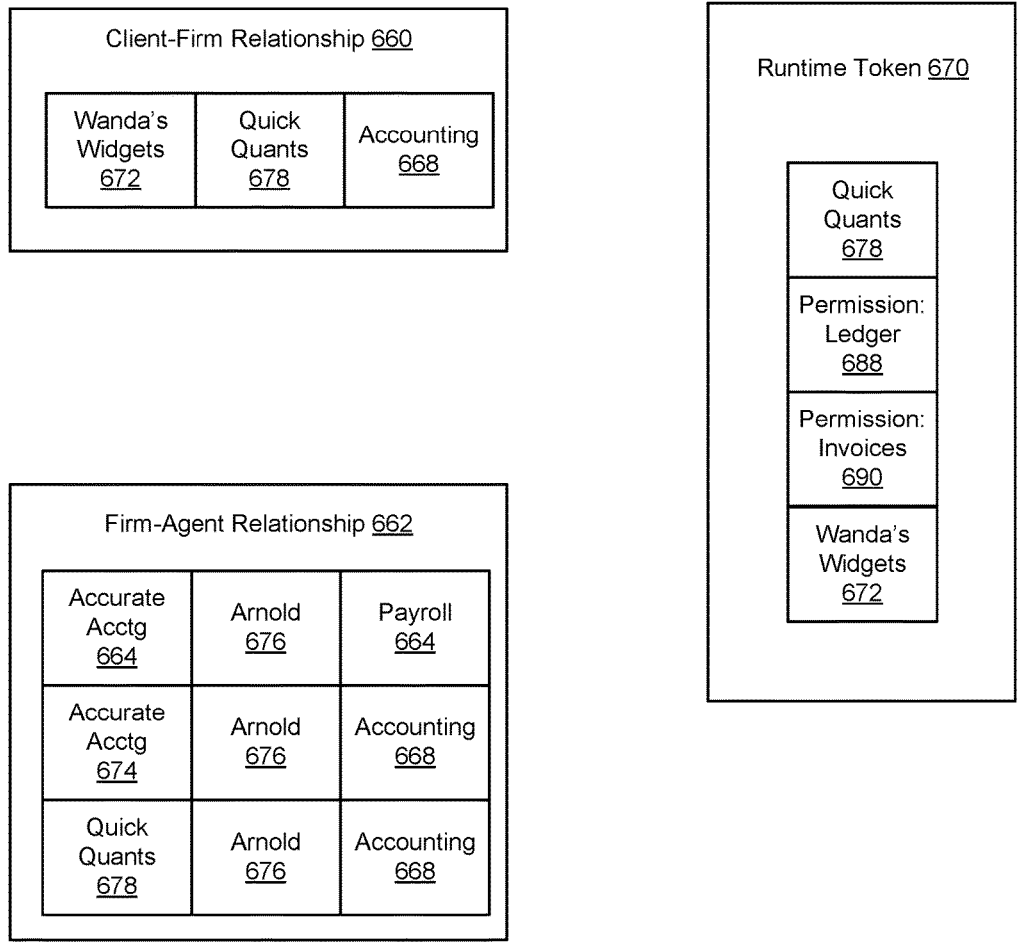

In Step 650, the role manager (608) receives a notification from Wanda's Widgets (602) that terminates the roles of "payroll" and "tax preparation" that had previously been assigned to Accurate Accounting (604). Then, in Step 652, the role manager (608) removes the roles of "payroll" and "tax preparation" from the client-firm relationship between Wanda's Widgets (602) and Accurate Accounting (604) in the repository (612). FIG. 6E shows that the client-firm relationship (660) in the repository no longer represents the assignment of the roles of "payroll" and "tax preparation" by Wanda's Widgets (672) to Accurate Accounting (604).

In Step 654, the runtime manager (610), upon detecting the terminated role assignments (e.g., via an explicit notification from the role manager (608)), updates the runtime token by removing the permissions associated with the now-terminated payroll role that had previously been assigned to Accurate Accounting (604). This is illustrated in FIG. 6E, which shows that the updated runtime token (670) now only includes permissions to access the ledger (688) and invoices (690), on behalf of Quick Quants (678). Therefore, Arnold (606) would no longer be able to request to work on Wanda's Widgets (672) on behalf of Accurate Accounting (674) (e.g., as in Step 626 of FIG. 6A), now that the permissions associated with his agent role on behalf of Accurate Accounting (674) have been removed from the runtime token. An alternative implementation is to allow the runtime token to expire on its own, without intervention. For example, during the runtime token's brief remaining lifetime, after Wanda's Widgets (602) has terminated the roles assigned by Wanda's Widgets (602) to Accurate Accounting (604), Arnold (606) may continue to be able to perform work on behalf of Accurate Accounting (604) for Wanda's Widgets (602). That is, the implementation of how quickly to update the runtime token upon termination of a role may be based on client expectations.

Returning to FIG. 6C, in Step 656, once Arnold (606) has finished work on Wanda's Widgets (672) on behalf of Quick Quants (678), and Arnold (606) does not indicate a selection of any other firm, the runtime manager (610) terminates the runtime session for Arnold (606) to perform work for Wanda's Widgets (602). This does not preclude Arnold (606) from working on behalf of Accurate Accounting (674) for some other client (e.g., in another runtime session, as in Step 624 above), since the firm-agent relationship between Accurate Accounting (674) and Arnold (606) remains intact.

Figure 7A:
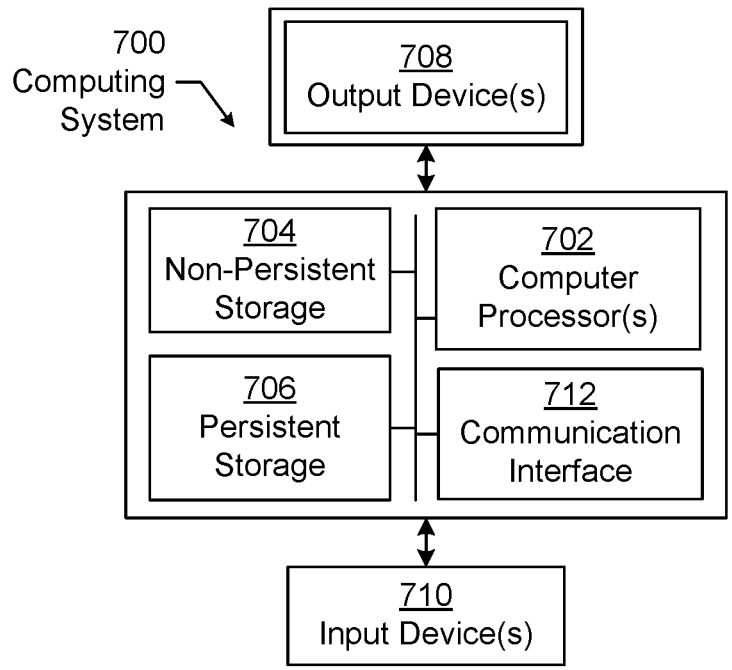
FIG. 7A and FIG. 7B show a computing system in accordance with one or more embodiments of the invention.

Embodiments disclosed herein may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 7B:
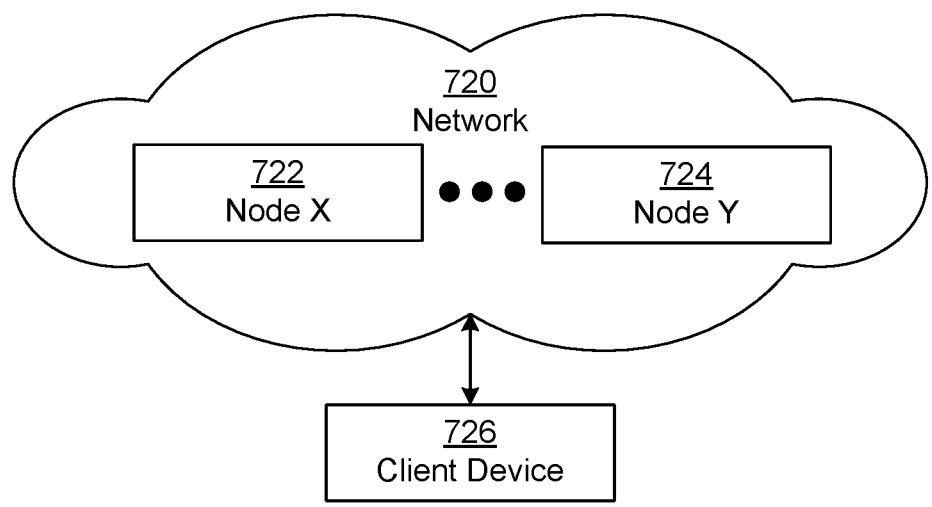

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments disclosed herein.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7A and the nodes and/or client device in FIG. 7B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for permission management comprising:
   partitioning, by a server computer, a relationship between a client and a first agent of a first firm into a first relationship between the client and the first firm and a second relationship between the first firm and the first agent, by:
   receiving an assignment of a first role to the first firm with respect to the client, wherein the first role comprises a first set of permissions granting access to a first portion of data in a business management application (BMA),
   receiving, in response to receiving the assignment of the first role, an assignment of a second role to the first agent of the first firm,
      wherein the second role comprises a second set of permissions granting access to a second portion of data in the BMA, and
      wherein the permissions to the second portion are less than the permissions to the first portion, and
   generating, for the first agent, a first runtime token for the BMA,
      wherein the first runtime token comprises a third set of permissions comprising an intersection of the first set of permissions and the second set of permissions,
      wherein the intersection is different than the first set of permissions and the second set of permissions, and
      wherein the third set of permissions granting access to a third portion of data in the BMA comprises an intersection of the first portion and the second portion,
   wherein the first relationship and the second relationship are independent of each other; and
   granting, responsive to receiving the first runtime token, access to the third portion of data.

2. The method of claim 1, further comprising:
   creating a third relationship between the client and a second firm;
   receiving, in response to creating the third relationship, an assignment of a third role to the second firm, the third role comprising a fourth set of permissions, wherein each permission in the fourth set of permissions permits access to the third portion of data in the BMA;
   receiving, in response to receiving the assignment of the third firm role, an assignment of a fourth role to the first agent, the fourth role comprising a fifth set of permissions, wherein each permission in the fifth set of permissions permits access to the third portion of data in the BMA, wherein the first agent is employed by the second firm; and
   adding, to the first runtime token, a sixth set of permissions comprising a second intersection of the fourth set of permissions and the fifth set of permissions.

3. The method of claim 2, further comprising:
   receiving a notification of the termination of the first role; and
   removing, from the first runtime token and in response to receiving the notification, the third set of permissions.

4. The method of claim 2, further comprising:
   receiving a notification of the termination of the second role; and
   removing, from the first runtime token and in response to receiving the notification, the third set of permissions.

5. The method of claim 1, further comprising:
   creating a third relationship between the client and a second agent;
   receiving, in response to creating the third relationship, an assignment of a third role to the second agent; and
   generating, for the second agent, a second runtime token comprising a set of token permissions based on the third role.

6. The method of claim 1, wherein the first relationship is created in response to a set of messages exchanged between the client and the first firm.

7. The method of claim 1, further comprising:
   receiving, in response to receiving the assignment of the first role, an assignment of a third role to a second agent of the first firm, wherein the second role and the third role are different, the third role comprising a fourth set of permissions granting access to the third portion of data in the BMA; and
   generating, for the second agent, a second runtime token for the BMA, the second runtime token comprising a fifth set of permissions comprising an intersection of the first set of permissions and the fourth set of permissions, the intersection different than the first set of permissions and the fourth set of permissions, and the fourth set of permissions granting access to a fourth portion of data in the BMA comprising an intersection of the first portion and the fourth portion.

8. The method of claim 1 further comprising:
changing, in response to a command received from the first firm, the second role between the first agent and the first firm without changing the first role between the first firm and the client, wherein changing the second role changes the second set of permissions and the third set of permissions without changing the first set of permissions, and wherein the first role is received from the client.

9. The method of claim 8 wherein changing the second role comprises removing the first role, wherein the third set of permissions are removed without changing the first set of permissions.

10. The method of claim 8 wherein changing the second role comprises adding new permissions to the second set of permissions, wherein the third set of permissions are altered without changing the first set of permissions.

11. A system for permission management comprising:
a role manager configured to:
partition, by a server computer, a relationship between a client and a first agent of a first firm into a first relationship between the client and the first firm and a second relationship between the first firm and the first agent, by:
receiving an assignment of a first role to the first firm with respect to the client, wherein the first role comprises a first set of permissions granting access to a first portion of data in a business management application (BMA); and
receiving, in response to receiving the assignment of the first role, an assignment of a second role to the first agent of the first firm,
wherein the second role comprises a second set of permissions granting access to a second portion of data in the BMA, and
wherein the permissions to the second portion are less than the permissions to the first portion,
wherein the first relationship and the second relationship are independent of each other;
a runtime manager configured to:
generate, for the first agent, a first runtime token for the BMA,
wherein the first runtime token comprises a third set of permissions comprising an intersection of the first set of permissions and the second set of permissions,
wherein the intersection is different than the first set of permissions and the second set of permissions, and
wherein the third set of permissions granting access to a third portion of data in the BMA comprises an intersection of the first portion and the second portion; and
grant, responsive to receiving the first runtime token, access to the third portion of data; and
a repository, configured to store at least the first role and the second role.

12. The system of claim 11,
wherein the role manager is further configured to:
create a third relationship between the client and a second firm;
receive, in response to creating the third relationship, an assignment of a third role to the second firm, the third role comprising a fourth set of permissions,
wherein each permission in the fourth set of permissions permits access to the third portion of data in the BMA; and
receive, in response to receiving the assignment of the third firm role, an assignment of a fourth role to the first agent, the fourth role comprising a fifth set of permissions, wherein each permission in the fifth set of permissions permits access to the third portion of data in the BMA, wherein the first agent is employed by the second firm, and
wherein the runtime manager is further configured to:
add, to the first runtime token, a sixth set of permissions comprising a second intersection of the fourth set of permissions and the fifth set of permissions.

13. The system of claim 12,
wherein the role manager is further configured to:
receive a notification of the termination of the first role, and
wherein the runtime manager is further configured to:
remove, from the first runtime token and in response to receiving the notification, the third set of permissions.

14. The system of claim 12,
wherein the role manager is further configured to:
receive a notification of the termination of the second role, and
wherein the runtime manager is further configured to:
remove, from the first runtime token and in response to receiving the notification, the third set of permissions.

15. The system of claim 11, wherein the first relationship is created in response to a set of messages exchanged between the client and the first firm.

16. A non-transitory computer readable medium comprising instructions that, when executed by a computer processor, perform a method for permission management comprising:
partitioning, by a server computer, a relationship between a client and a first agent of a first firm into a first relationship between the client and the first firm and a second relationship between the first firm and the first agent, by:
receiving an assignment of a first role to the first firm with respect to the client, wherein the first role comprises a first set of permissions granting access to a first portion of data in a business management application (BMA),
receiving, in response to receiving the assignment of the first role, an assignment of a second role to the first agent of the first firm,
wherein the second role comprises a second set of permissions granting access to a second portion of data in the BMA, and
wherein the permissions to the second portion are less than the permissions to the first portion, and
generating, for the first agent, a first runtime token for the BMA,
wherein the first runtime token comprises a third set of permissions comprising an intersection of the first set of permissions and the second set of permissions,
wherein the intersection is different than the first set of permissions and the second set of permissions, and wherein the third set of permissions granting access to a third portion of data in the BMA comprises an intersection of the first portion and the second portion, wherein the first relationship and the second relationship are independent of each other; and granting, responsive to receiving the first runtime token, access to the third portion of data.

17. The non-transitory computer readable medium of claim 16, the method further comprising:

creating a third relationship between the client and a second firm;

receiving, in response to creating the third relationship, an assignment of a third role to the second firm, the third role comprising a fourth set of permissions, wherein each permission in the fourth set of permissions permits access to the third portion of data in the BMA;

receiving, in response to receiving the assignment of the third firm role, an assignment of a fourth role to the first agent, the fourth role comprising a fifth set of permissions, wherein each permission in the fifth set of permissions permits access to the third portion of data in the BMA, wherein the first agent is employed by the second firm; and adding, to the first runtime token, a sixth set of permissions comprising a second intersection of the fourth set of permissions and the fifth set of permissions.

18. The non-transitory computer readable medium of claim 17, the method further comprising:

receiving a notification of the termination of the first role; and removing, from the first runtime token and in response to receiving the notification, the third set of permissions.

19. The non-transitory computer readable medium of claim 16, the method further comprising:

creating a third relationship between the client and a second agent;

receiving, in response to creating the third relationship, an assignment of a third role to the second agent; and generating, for the second agent, a second runtime token comprising a set of token permissions based on the third role.

20. The non-transitory computer readable medium of claim 16, wherein the first relationship is created in response to a set of messages exchanged between the client and the first firm.

\* \* \* \* \*